(12) United States Patent
Kuroiwa

(10) Patent No.: US 6,679,427 B1
(45) Date of Patent: Jan. 20, 2004

(54) MAGNETIC CARD READER

(75) Inventor: Yukio Kuroiwa, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 0 days.

(21) Appl. No.: 09/551,958

(22) Filed: Apr. 19, 2000

(30) Foreign Application Priority Data

Apr. 22, 1999 (JP) .......................... 11-115407

(51) Int. Cl.[7] ................................ G06K 7/08
(52) U.S. Cl. ................ 235/449; 235/436; 235/493; 235/375; 235/380
(58) Field of Search ............... 235/436, 449, 235/493, 375, 380, 450; 360/53; 705/21

(56) References Cited

U.S. PATENT DOCUMENTS

| | | | | |
|---|---|---|---|---|
| 3,947,663 A | * | 3/1976 | De Sandre et al. | 235/483 |
| 4,390,964 A | * | 6/1983 | Horky et al. | 364/900 |
| 4,768,163 A | * | 8/1988 | Clark et al. | 235/482 |
| 4,849,616 A | * | 7/1989 | Mizote | 235/449 |
| 4,855,583 A | * | 8/1989 | Fraser et al. | 235/440 |
| 5,012,077 A | * | 4/1991 | Takano | 235/375 |
| 5,285,328 A | | 2/1994 | Behr et al. | 360/53 |
| 5,581,257 A | * | 12/1996 | Greene et al. | 235/375 |
| 5,679,945 A | * | 10/1997 | Renner et al. | 235/441 |
| 5,753,898 A | * | 5/1998 | Hekstra | 235/380 |
| 5,799,171 A | * | 8/1998 | Kondou | 395/500 |
| 5,988,500 A | * | 11/1999 | Litman | 235/450 |
| 6,254,002 B1 | * | 7/2001 | Litman | 235/450 |
| 6,311,165 B1 | * | 10/2001 | Coutts et al. | 705/21 |

OTHER PUBLICATIONS

International standard ISO/IEC 7811–2, Identification Cards—Recording Technique—Part 2 Magnetic Stripe.

* cited by examiner

Primary Examiner—Michael G. Lee
Assistant Examiner—Steven S. Paik

(57) ABSTRACT

A magnetic card reader to read magnetic cards having either a first or a second format for the magnetic data on a stripe. The reader includes a first and second format processor for first and second patterns, a format selector to select one of the two format processor in accordance with a selection or indication command from a host computer. A format determinator determines if the format read out from the card is consistent with the indicated format.

9 Claims, 4 Drawing Sheets

MAGNETIC CARD READER

BACKGROUND OF THE INVENTION

The present invention relates to a magnetic card reader. More specifically, the present invention relates to a magnetic card reader which can read magnetic cards having a plurality of formats.

In general, magnetic cards used with a magnetic card reader have a format standardized by JIS (Japanese Industrial Standard) and ISO (International Standardization Organization). Therefore, only one processing pattern for encoding and decoding is employed in the case of recording and reproducing (regeneration) of magnetic data by firmware of a CPU loaded on the magnetic card reader. Accordingly, to use a non-standardized magnetic card, another magnetic card reader having firmware for a processing pattern corresponding to the non-standardized magnetic card must be available.

Also, some suggest a magnetic card reader with which magnetic cards having a plurality of formats can be used (e.g. Tokko S63-56578, Tokkai H2-130670 and Tokkai H8-138003). In this case, the magnetic card reader serids read-out magnetic data to a host computer without converting the format wherein the format of the magnetic card is determined, or a user selects the kind of a magnetic card by pressing buttons and the like.

However, the above magnetic card reader providing only one processing pattern for encoding and decoding cannot handle both a standardized magnetic card and a non-standardized magnetic card. In order to use magnetic cards having different formats, a magnetic card reader corresponding to each format is required; this is very costly. Also, if various magnetic card readers corresponding to different formats are provided, it is confusing for a user to determine a correct card reader for his/her magnetic card.

In the case of a magnetic card reader which can handle magnetic cards having a plurality of formats by using a host computer to determine the format of a card, enormous load of controlling the entire system is exerted on the host computer. Further, if an user needs to select the kind of a magnetic card by using buttons and the like, operation to use the card becomes complicated, which is not convenient for the user.

The present invention intends to provide a magnetic card reader which can determine the format of magnetic cards having a plurality of formats without a host computer.

DESCRIPTION OF THE PREFERRED EMBODIMENTS

The following describes preferable embodiments of the present invention in reference to drawings.

Figure 1:
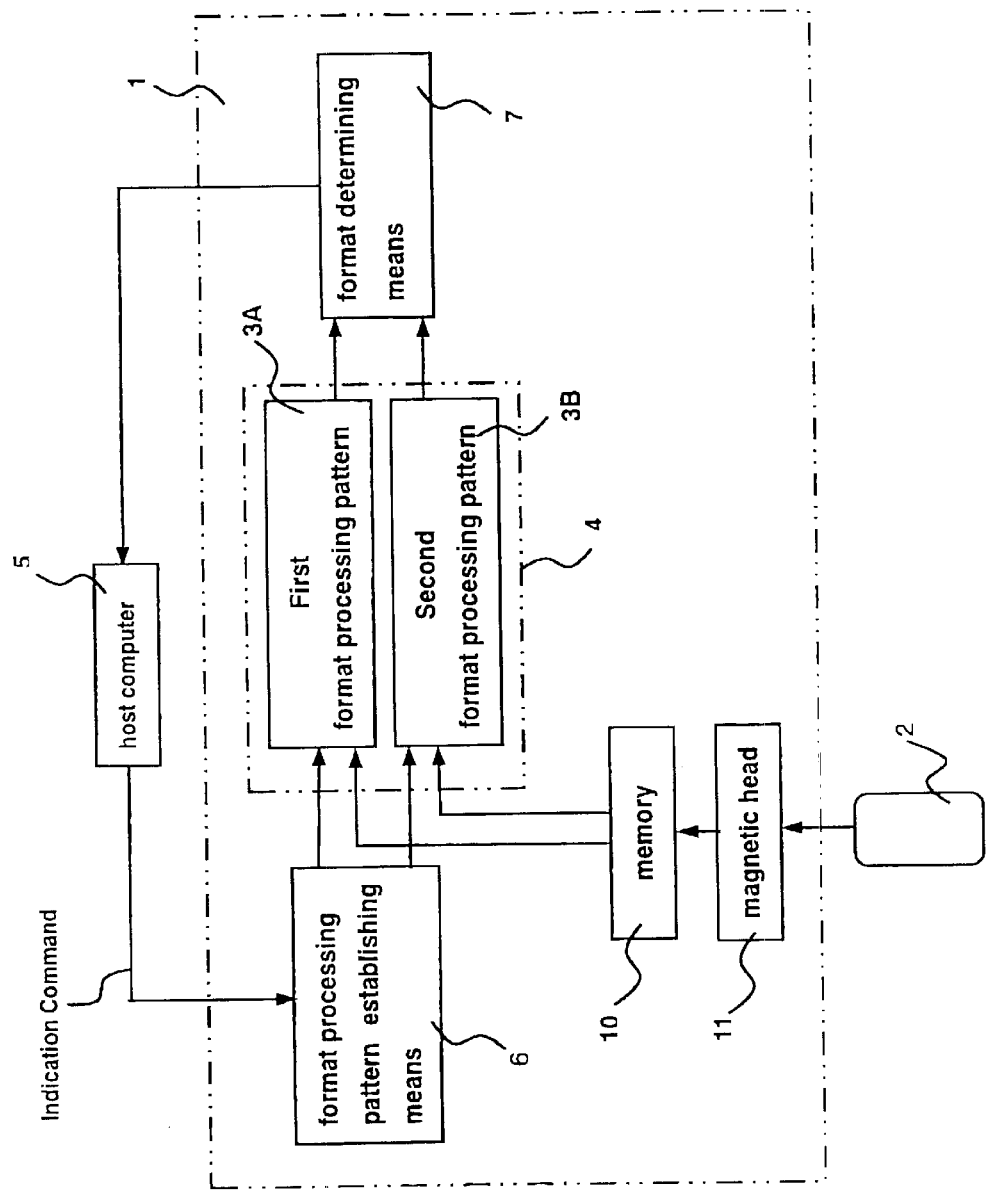
FIG. 1 is a chart schematically showing an embodiment of a magnetic card reader according to the present invention.

FIG. 1 shows an embodiment of a magnetic card reader according to the present invention. Magnetic card reader 1 reads magnetic cards 2 having a plurality of formats. The reader includes a format processing means 4 which has a plurality of format processing patterns 3A and 3B; a format processing pattern establishing means 6 which establishes the indicated format processing pattern among a plurality of format processing patterns 3A and 3B according to an indication command indicating the format sent from host machine (host computer) 5; and format determining means 7 which determines whether the indicated format and the format read out from magnetic card 2 are consistent, then sends the result of determination to host computer 5. Magnetic card reader 1 of this embodiment has two kinds of format processing patterns 3A and 3B and can read magnetic cards 2 having two different kinds of formats.

Figure 2:
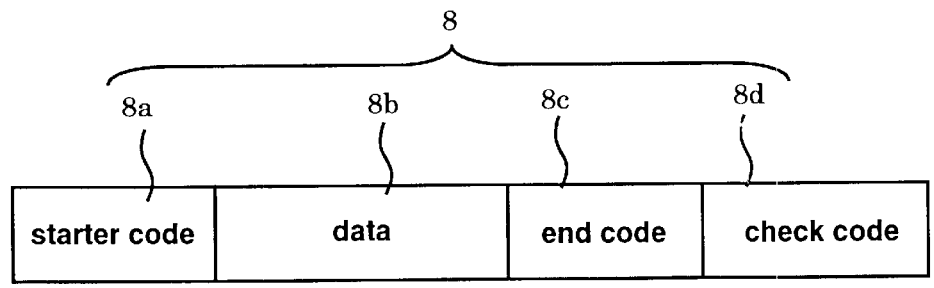
FIG. 2 is a schematic configuration of magnetic data.

FIG. 2 shows a basic configuration of magnetic data 8 recorded on magnetic card 2. Magnetic data 8 are formed of start code 8a, data 8b, end code 8c and check code 8d. However, a certain restriction is imposed by the kind of format. That is, in the case of format A, the kind of character code used for data 8b is limited, but the number of characters is variable. In the case of format B, the kind of character code used for data 8b is unlimited, but the number of characters is fixed.

Format processing pattern 3A corresponding to format A runs a format checking process based on information whether an unspecified character code exists. Then, end code 8c determines the end of magnetic data 8. Also, format processing pattern 3B corresponding to format B runs a format checking process based on information whether end code 8c is located at a predetermined position. Format processing pattern establishing means 6 switches format processing patterns 3 for format A and format B based on an indication command from host computer 5.

Figure 3:
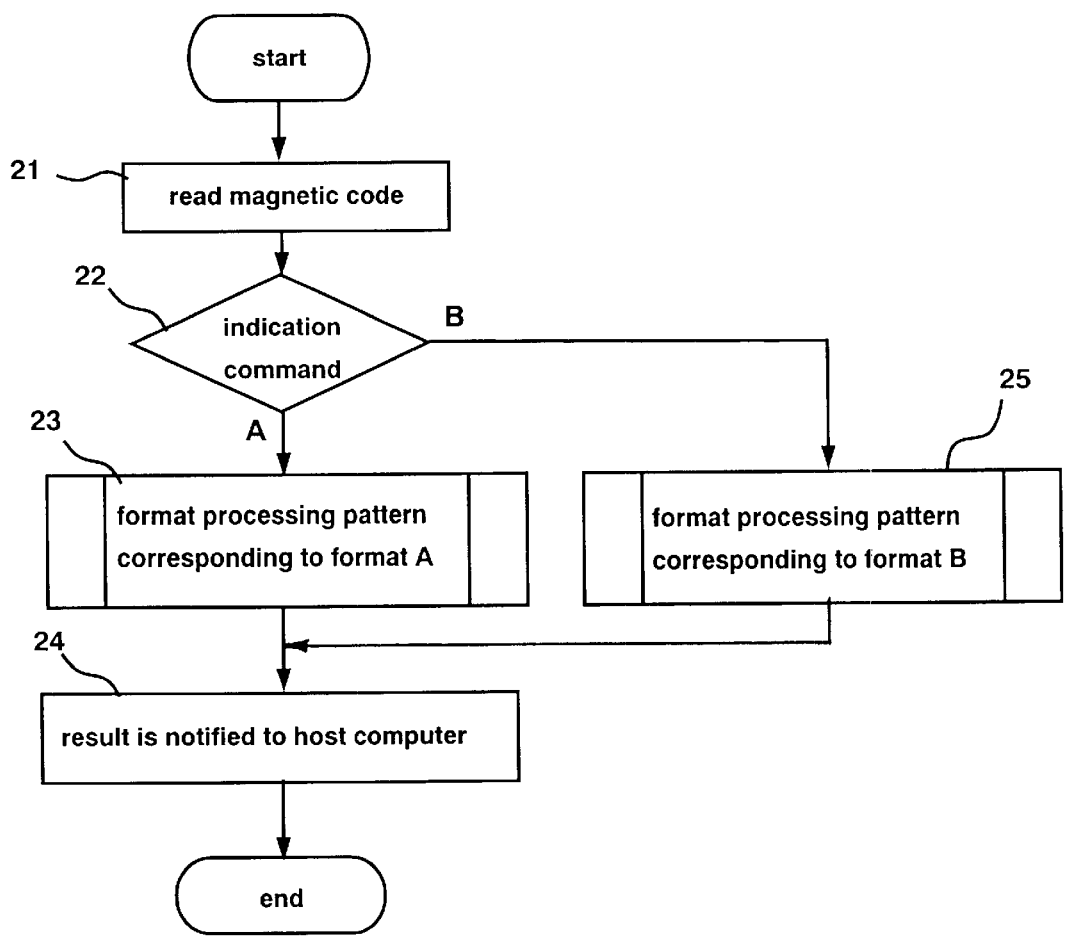
FIG. 3 is a flow chart of firmware of a magnetic card reader according to the present invention.
Figure 4:
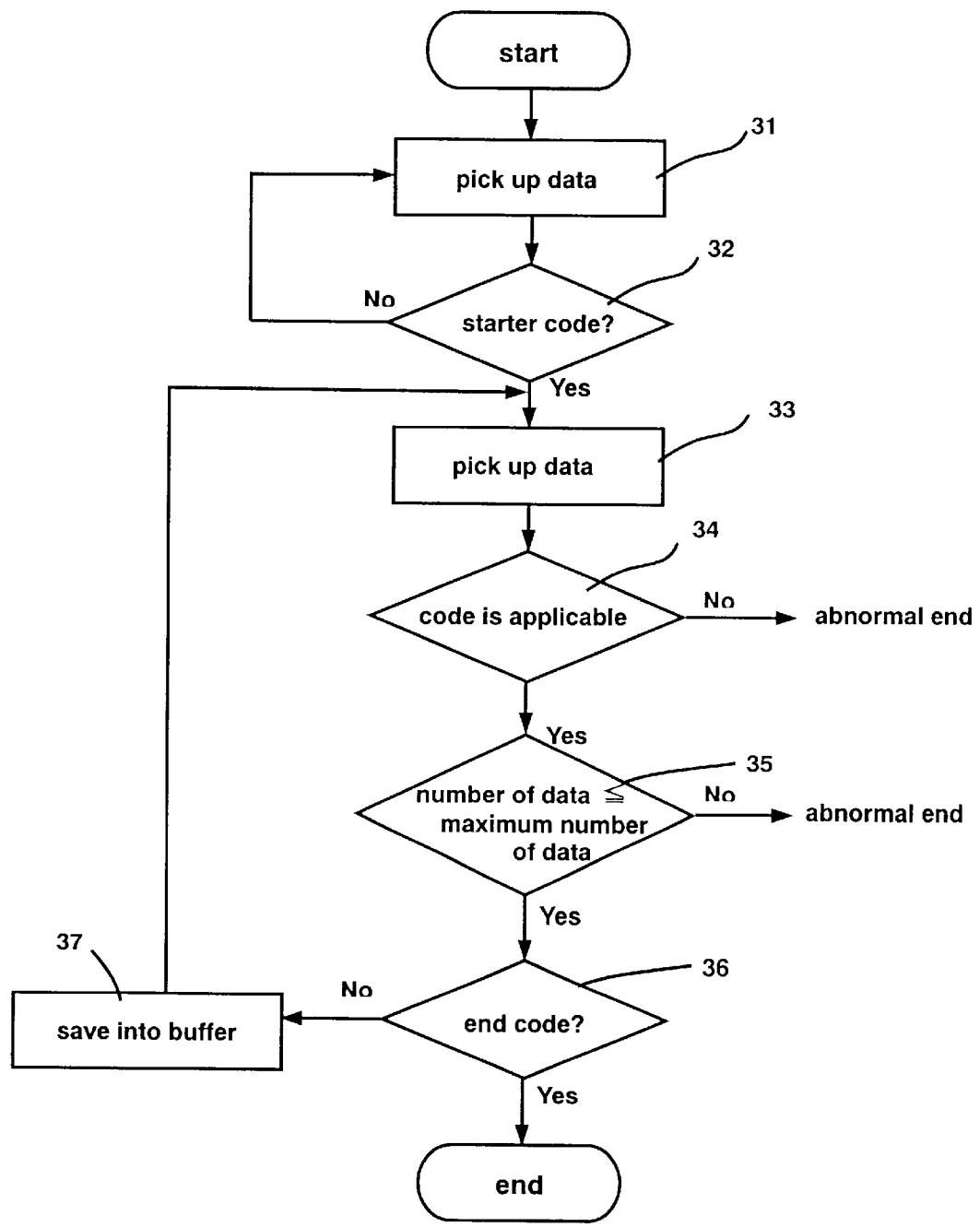
FIG. 4 is a flow chart showing a format processing pattern corresponding to format A.
Figure 5:
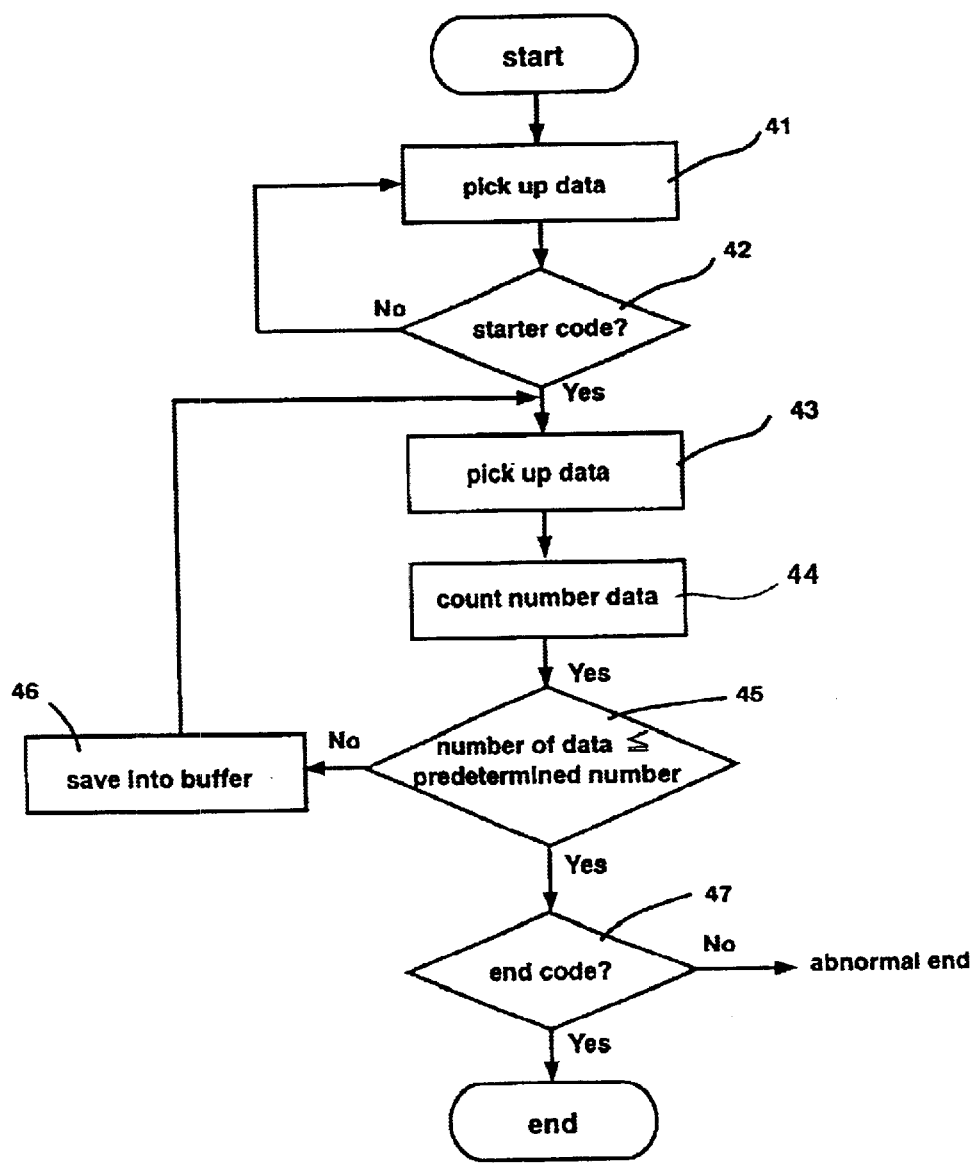
FIG. 5 is a flow chart showing a format processing pattern corresponding to format B.

The following describes processing operation of magnetic card reader 1 in reference to FIGS. 3 through 5. Programs shown in FIGS. 3 through 5 are installed in magnetic card reader 1 as firmware thereof.

When magnetic card 2 is taken into magnetic card reader 1, magnetic head 11 reads magnetic data 8 recorded on magnetic card 2; magnetic data 8 then are stored in memory 10 (step S21). Then, host computer 5 provides an indication command to format processing pattern establishing means 6 (step S22). Magnetic card reader 1 of this embodiment can handle magnetic cards 2 having two kinds of formats, format A and format B; accordingly, provided indication commands are either command A or command B.

When command A is provided by host computer 5, format processing pattern establishing means 6 establishes format processing pattern 3 corresponding to format A selected from format processing means 4 (step S23). FIG. 4 shows order of process using format processing pattern 3A corresponding to format A. First, in step S31, the first set of data is retrieved from magnetic data 8 stored in memory 10 while decoding it. If the data are starter code 8a, the process proceeds to step S33. If the data are other than starter code 8a, the process returns to step S31 where the next set of data is retrieved; this is repeated until starter code 8a is found.

In step S33, the next set of data following starter code 8a is picked up (retrieved) while decoding it; then, whether the code of the data is an applicable code (character) is determined (step S34). If the code is applicable, the process proceeds to step S35 where whether the number of data is less than a maximum data number is determined. If it is less than the maximum data number, the process proceeds to step S36 where whether the data are end code 8c is determined. If the data are other than end code 8c, continuing data are expected. Therefore, after saving the data in a predetermined buffer (step S37), the process returns to step S33 where the following data are picked up (retrieved) while decoding them; step S33 through step S37 are repeated. When the process of step S33 through step S37 are performed for all sets of data, normal finish results; then, the process returns from step S36 to step S24 of FIG. 3. In other words, data 8b of magnetic data 8 is converted and saved in the buffer.

On the other hand, if the picked up (retrieved) data include codes other than applicable code, it is believed that there is an error, such as the format of magnetic card 2 is other than format A, resulting in abnormal end in step S34. Also, when the number of the picked up (retrieved) data exceeds the maximum data number, an error is suspected, resulting in abnormal end in step S35.

Accordingly, format processing pattern 3 of format A corresponding to the indication command from host computer 5 is implemented, then a format checking process is performed.

In step S24 of FIG. 3, format determining means 7 notifies host computer whether the format checking process ended (finished) normally. That is, a determination is made as to whether the format of magnetic card 2 is consistent with the format indicated by the host computer. If it is ended (finished) normally, the contents of the converted data in the buffer are provided to host computer 5. Thereafter, the program is ended (finished).

When the format checking process corresponding to format A is ended (finished) abnormally, host computer 5 provides command B to format processing pattern establishing means 6. Accordingly, format processing pattern establishing means 6 establishes format processing pattern 3 corresponding to format B from format processing means 4 (step S25).

FIG. 5 shows format processing pattern 3 corresponding to format B. First, in step S41, the first set of data is picked up (retrieved) from magnetic data 8 stored in memory 10 while decoding it. If the data are starter code 8a, the process processes from step S42 to step S43. If the data are other than starter code 8a, the process returns to step S41 where the next set of data is picked up (retrieved) while decoding it; this operation is repeated until starter code 8a is found.

In step S43, the data next to starter code 8a are picked up (retrieved) while decoding them; then, the number of the data is counted (step S44). As the number of the data is counted as 1, the process proceeds from step S45 to step S46 where the data are saved in a predetermined buffer. The operation between step S43 and S46 is repeated until the number of data reaches a predetermined number. In other words, magnetic data 8 are converted and saved in the buffer.

When the number of data reaches the predetermined number, the process proceeds from step S45 to step S47 where whether the currently picked up (retrieved) data are end code 8c is determined. If the format of magnetic data 8 recorded on magnetic card 2 is format B as indicated, the data should be end code 8c. Therefore, the process returns from step S47 to step S24 of FIG. 3 as a normal end.

On the other hand, if the currently picked up (retrieved) data are other than end code 8c, it is believed that there is an error, such as the format of magnetic card 2 is other than format B, resulting in abnormal end in step S47; thereafter, the process returns to step S24 of FIG. 3.

As described above, format processing pattern 3B of format B corresponding to the indication command from host computer 5 is performed; then, a format checking process is performed.

In step S24 of FIG. 3, format determining means 7 notifies host computer 5 whether the format checking process is ended (finished) normally. That is, a determination is made as to whether the format of magnetic card 2 is consistent with the format indicated by the host computer. If it is ended (finished) normally, the contents of the converted data in the buffer are provided to host computer 5; thereafter, the program is ended (finished).

Thereafter, host computer 5 performs a predetermined process based on the result notified by format determining means 7. When data is written onto magnetic card 2 after the predetermined process, host computer 5 provides an indication command indicating the format and data to be written to magnetic card reader 1. Accordingly, magnetic card reader 1 converts the data to be written by performing the above format checking process and write the data onto magnetic card 2 via magnetic head 11. In other words, magnetic card reader 1 converts data by performing the format checking process as described above during reproducing (regeneration)/recording of data.

The above is a preferred embodiment of the present invention. However, one is not limited to the above; various modifications are applicable within the scope of the present invention. For example, the above description is about an example in which magnetic cards 2 having two kinds of formats are handled. Magnetic cards 2 having three formats or more can be handled by increasing the number of format processing patterns.

EFFECTS OF THE INVENTION

As described the above invention, magnetic cards having different formats can be handled in one magnetic card reader; a plurality of magnetic card readers are not necessary for use of magnetic cards having different formats. Accordingly, costs can be reduced. Also, the format processing means of the magnetic card reader performs a format processing pattern corresponding to an indication command from the host machine; it also performs a format checking process. Hence, the host machine only needs to provide an indication command in order to obtain a result of a format checking process; the load on the host machine is reduced. Further, an user does not have to indicate a kind of the card by pushing buttons and the like; the load on the user is reduced, and the use of the card becomes more convenient.

Also, a magnetic card reader can be configured to have two kinds of format processing patterns and to read magnetic cards having two different formats.

What is claimed is:

1. A magnetic card reader which reads magnetic cards having a plurality of formats comprising:
   a format processing means including:
      first format processing means operable to process a magnetic card based on a first format to check whether the encoded data on the magnetic card is recorded in the first format;
      second format processing means operable to process the magnetic card based on a second format to check whether the encoded data on the magnetic card is recorded in the second format, wherein the magnetically encoded data in the first or second format is recorded on a magnetic stripe and includes a start code, data, end code and a check code, the first and second formats being different from each other;
   a format processing pattern establishing means which selects said first format processing means or said second format processing means according to an indication command sent from a host machine which indicates which format to process by said format processing means; and a format determining means which determines whether said indicated format and the format read from the magnetic card are consistent in accordance with the result of said format processing means, then sends the result of the determination to said host machine.

2. The magnetic card reader according to claim 1 which has two kinds of format processing patterns and which can read magnetic cards having two different formats.

3. The magnetic card reader of claim 1 wherein said plurality of formats include a JIS or ISO format, and a non-standard format.

4. The magnetic card reader of claim 2 wherein said plurality of formats include a JIS or ISO format, and a non-standard format.

5. The magnetic card reader of claim 1 wherein the result of the determination sent from the format determining means includes converted data of the encoded data on the magnetic card.

6. A magnetic card reader which reads magnetic cards having a plurality of magnetically encoded formats, comprising:

a first format processor operable to convert magnetically encoded card holder data encoded in a first format;

a second format processor operable to convert magnetically encoded card holder data encoded in a second format;

a form at selector operable to select the first format processor or the second format processor according to a format indication command from a host machine which indicates which format to process; and a format determinator operable to determine whether the indicated format from the host machine and the format converted by the selected format processor are consistent, the format determinator further operable to send the converted card holder data to the host machine if it is determined that the indicated format and the converted format are consistent, to relieve the host machine from the format conversion.

7. The magnetic card according to claim 6 wherein if it is determined that the indicated format and the converted format are inconsistent, the format determinator sends an indication to the host machine indicating that the conversion process by the selected format processor was unsuccessful.

8. The magnetic card according to claim 6 wherein:

the format determinate r sends an indication to the host machine indicating that the conversion process by the selected format processor was unsuccessful;

the format selector receives another format indication command from the host machine indicating selection of a format processor which is different from the previously selected format processor; and the format selector selects the format processor according to the another format indication command.

9. A magnetic card reader which reads magnetic cards having a plurality of magnetic formats comprising:

first and second format processors operable to process magnetic cards containing magnetically encoded data in first and second magnetic formats, respectively;

a format processing pattern establishing device coupled to the first and second format processors and controlled by a host machine that is remotely located from the magnetic card reader, the format processing pattern establishing device operable to:

receive from the remotely located host machine an indication command that instructs the format processing pattern establishing device which magnetic format to process, and select the first format processor or the second format processor according to the received indication command; and a format determinator which determines whether the indicated magnetic format and the magnetic format read from a magnetic card are consistent, then sends the result of the determination to the remotely located host machine.

* * * * *